US012782939B2

(12) United States Patent
Hattori et al.

(10) Patent No.: US 12,782,939 B2
(45) Date of Patent: Nov. 3, 2026

(54) OBSTACLE DETECTION DEVICE AND TRAVELING CONTROL DEVICE

(71) Applicant: KABUSHIKI KAISHA TOYOTA JIDOSHOKKI, Kariya (JP)

(72) Inventors: Shingo Hattori, Kariya (JP); Tatsuya Mita, Kariya (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 296 days.

(21) Appl. No.: 18/130,144

(22) Filed: Apr. 3, 2023

(65) Prior Publication Data

US 2023/0324913 A1 Oct. 12, 2023

(30) Foreign Application Priority Data

Apr. 8, 2022 (JP) ................................ 2022-064539

(51) Int. Cl.
*G05D 1/00* (2024.01)
*G01S 17/89* (2020.01)
*G01S 17/931* (2020.01)

(52) U.S. Cl.
CPC ............ *G05D 1/0214* (2013.01); *G01S 17/89* (2013.01); *G01S 17/931* (2020.01)

(58) Field of Classification Search
CPC ..... G05D 1/0214; G01S 17/931; G01S 17/89; G01S 13/931; G01S 15/931; B60W 30/09
See application file for complete search history.

(56) References Cited

U.S. PATENT DOCUMENTS 10,262,215 B2 * 4/2019 Yoshihira ............... G08G 1/165
11,126,944 B1 * 9/2021 Aggarwal ............. G06F 9/4887
12,286,106 B2 * 4/2025 Kario .............. B60W 30/18145
12,337,876 B2 * 6/2025 Zhang ............... B60W 30/0956
2011/0202247 A1 8/2011 Takeoka
2016/0138247 A1 5/2016 Conway et al.
2017/0285646 A1 * 10/2017 Connor ............... B60W 10/184
2018/0027179 A1 1/2018 Matsuzaki et al.
2019/0163190 A1 5/2019 Ono
2021/0090263 A1 * 3/2021 Liu ........................... G06T 7/13
2024/0166196 A1 * 5/2024 Liu ................... B60W 30/0956
(Continued)

FOREIGN PATENT DOCUMENTS

JP 2011-165025 A 8/2011
JP 2016-13887 A 1/2016
(Continued)

*Primary Examiner* — Christian Chace
*Assistant Examiner* — Minato Lee Horner
(74) *Attorney, Agent, or Firm* — Sughrue Mion, PLLC

(57) ABSTRACT

An obstacle detection device includes: a trajectory generating unit configured to acquire a scheduled traveling trajectory of a forklift including a plurality of trajectory points; a detection area setting unit configured to set an obstacle detection area for detecting an obstacle which is present in a traveling direction of the forklift by mapping a detection frame surrounding the forklift as a whole on the trajectory points of the scheduled traveling trajectory acquired by the trajectory generating unit; an obstacle sensor configured to detect the obstacle; and an obstacle determining unit configured to determine whether the obstacle is present in the obstacle detection area set by the detection area setting unit based on point group data from the obstacle sensor.

2 Claims, 14 Drawing Sheets

(56) References Cited

U.S. PATENT DOCUMENTS

| | | | | |
|---|---|---|---|---|
| 2024/0286878 A1* | 8/2024 | Qi | .......................... | B66F 9/0755 |
| 2024/0385626 A1* | 11/2024 | Obara | .................... | G05D 1/646 |

FOREIGN PATENT DOCUMENTS

| | | | |
|---|---|---|---|
| JP | 2018-14554 | A | 1/2018 |
| JP | 2019-097454 | A | 6/2019 |
| JP | 2021-195215 | A | 12/2021 |

* cited by examiner

OBSTACLE DETECTION DEVICE AND TRAVELING CONTROL DEVICE

TECHNICAL FIELD

The present disclosure relates to an obstacle detection device and a traveling control device.

BACKGROUND

For example, technology described in Japanese Unexamined Patent Publication No. 2019-97454 is known as a traveling control device according to the related art. The traveling control device described in Japanese Unexamined Patent Publication No. 2019-97454 includes a vehicle ECU that controls traveling of a working vehicle, an autonomous driving ECU that calculates a self-position of the working vehicle based on positioning signals received via a GPS antenna, compares the self-position with a scheduled traveling trajectory, and transmits a control signal for the vehicle ECU, and an obstacle sensor that detects whether there is an obstacle in front of the working vehicle.

SUMMARY

In unmanned autonomous driving, a scheduled traveling trajectory and an actual traveling trajectory may deviate from each other. In this case, erroneous detection may be performed and the working vehicle may stop when an obstacle is present in front of the working vehicle.

An objective of the present disclosure is to provide an obstacle detection device and a traveling control device that can curb erroneous detection of an obstacle even when a scheduled traveling trajectory and an actual traveling trajectory deviate from each other.

An obstacle detection device according to an aspect of the present disclosure includes: a trajectory acquiring unit configured to acquire a scheduled traveling trajectory of an industrial vehicle including a plurality of trajectory points; a detection area setting unit configured to set an obstacle detection area for detecting an obstacle which is present in a traveling direction of the industrial vehicle by mapping a detection frame surrounding the industrial vehicle as a whole on the trajectory points of the scheduled traveling trajectory acquired by the trajectory acquiring unit; an obstacle detecting unit configured to detect the obstacle; and an obstacle determining unit configured to determine whether the obstacle is present in the obstacle detection area set by the detection area setting unit based on detection data from the obstacle detecting unit.

A traveling control device according to another aspect of the present disclosure includes: a drive unit configured to cause an industrial vehicle to travel; a trajectory acquiring unit configured to acquire a scheduled traveling trajectory of the industrial vehicle including a plurality of trajectory points; a first control unit configured to control the drive unit such that the industrial vehicle travels along the scheduled traveling trajectory; a detection area setting unit configured to set an obstacle detection area for detecting an obstacle which is present in a traveling direction of the industrial vehicle by mapping a detection frame surrounding the industrial vehicle as a whole on the trajectory points of the scheduled traveling trajectory acquired by the trajectory acquiring unit; an obstacle detecting unit configured to detect the obstacle; an obstacle determining unit configured to determine whether the obstacle is present in the obstacle detection area set by the detection area setting unit based on detection data from the obstacle detecting unit; and a second control unit configured to control the drive unit such that the industrial vehicle decelerates or stop when the obstacle determining unit determines that the obstacle is present in the obstacle detection area.

DETAILED DESCRIPTION

Figure 1:
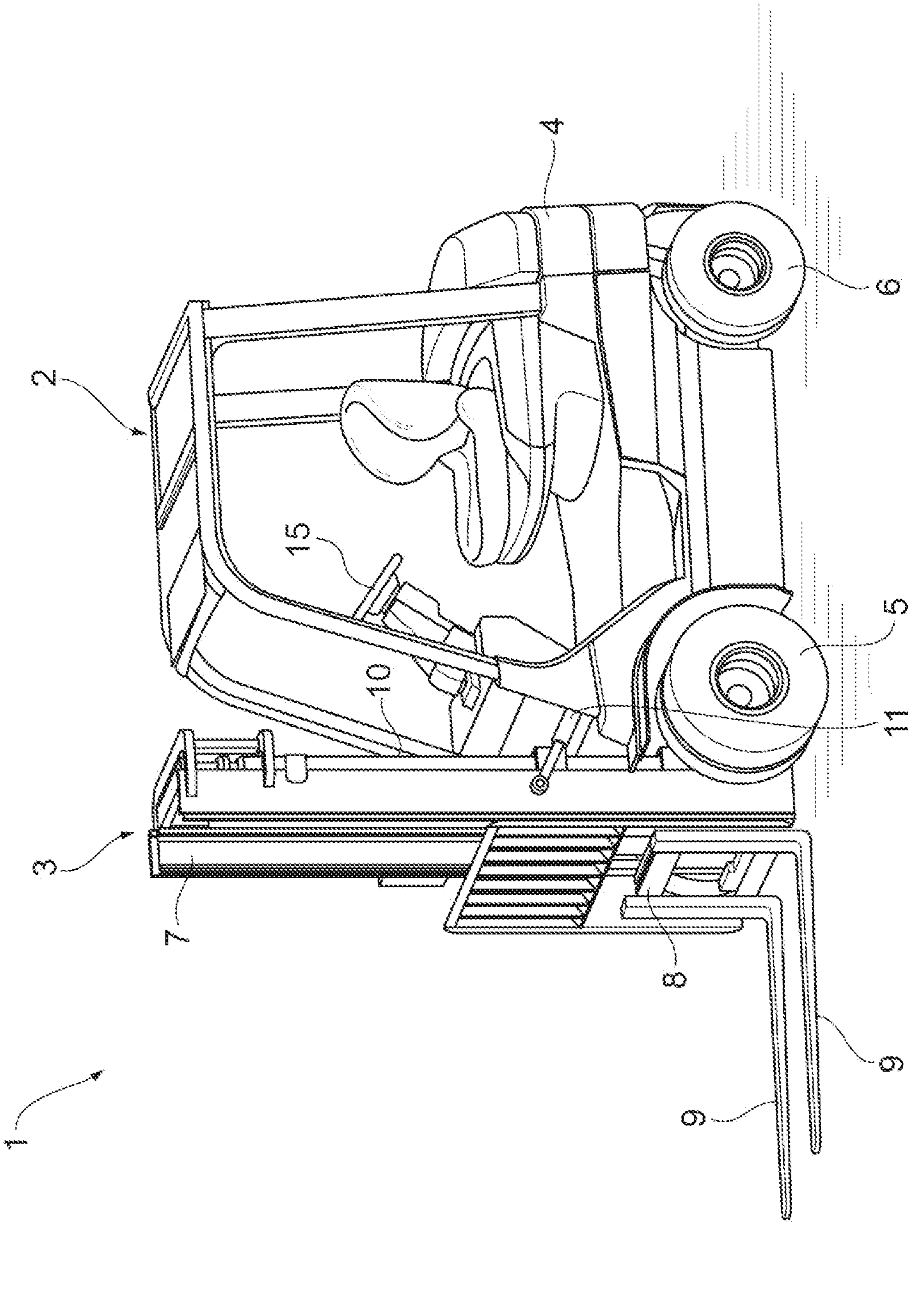
FIG. 1 is a perspective view illustrating a forklift which is an industrial vehicle including an obstacle detection device and a traveling control device according to an embodiment of the present disclosure.

Hereinafter, embodiments of the present disclosure will be described in detail with reference to the accompanying drawings. In the drawings, the same or equivalent elements will be referred to by the same reference signs and repeated description thereof will be omitted.

FIG. 1 is a perspective view illustrating a forklift which is an industrial vehicle including an obstacle detection device and a traveling control device according to an embodiment of the present disclosure. In FIG. 1, the forklift 1 is an industrial vehicle that performs loading/unloading work. The forklift 1 includes a traveling device 2 and a loading/unloading device 3 that is provided at the front of the traveling device 2.

The traveling device 2 includes a vehicle body 4, front wheels 5 which are a pair of right and left driving wheels disposed at the front of the vehicle body 4, and rear wheels 6 which are a pair of right and left turning wheels disposed at the back of the vehicle body 4.

The loading/unloading device 3 includes a mast 7 that is attached from a front end of the vehicle body 4, a pair of right and left forks 9 that are detachably attached to the mast 7 via a lift bracket 8 such that the forks can move up and down, a lift cylinder 10 that moves the forks 9 up and down, and a tilt cylinder 11 that tilts the mast 7. The forks 9 are a working tool that holds a pallet 12 (see FIG. 3). The forks 9 are detachably attached to the lift bracket 8.

The pallet 12 is, for example, a flat pallet formed of plastic or wood. The pallet 12 has a rectangular shape in a plan view. Cargo (not illustrated) is placed on the pallet 12. A pair of right and left fork holes 13 into which the forks 9 are inserted are provided in the pallet 12.

Figure 2:
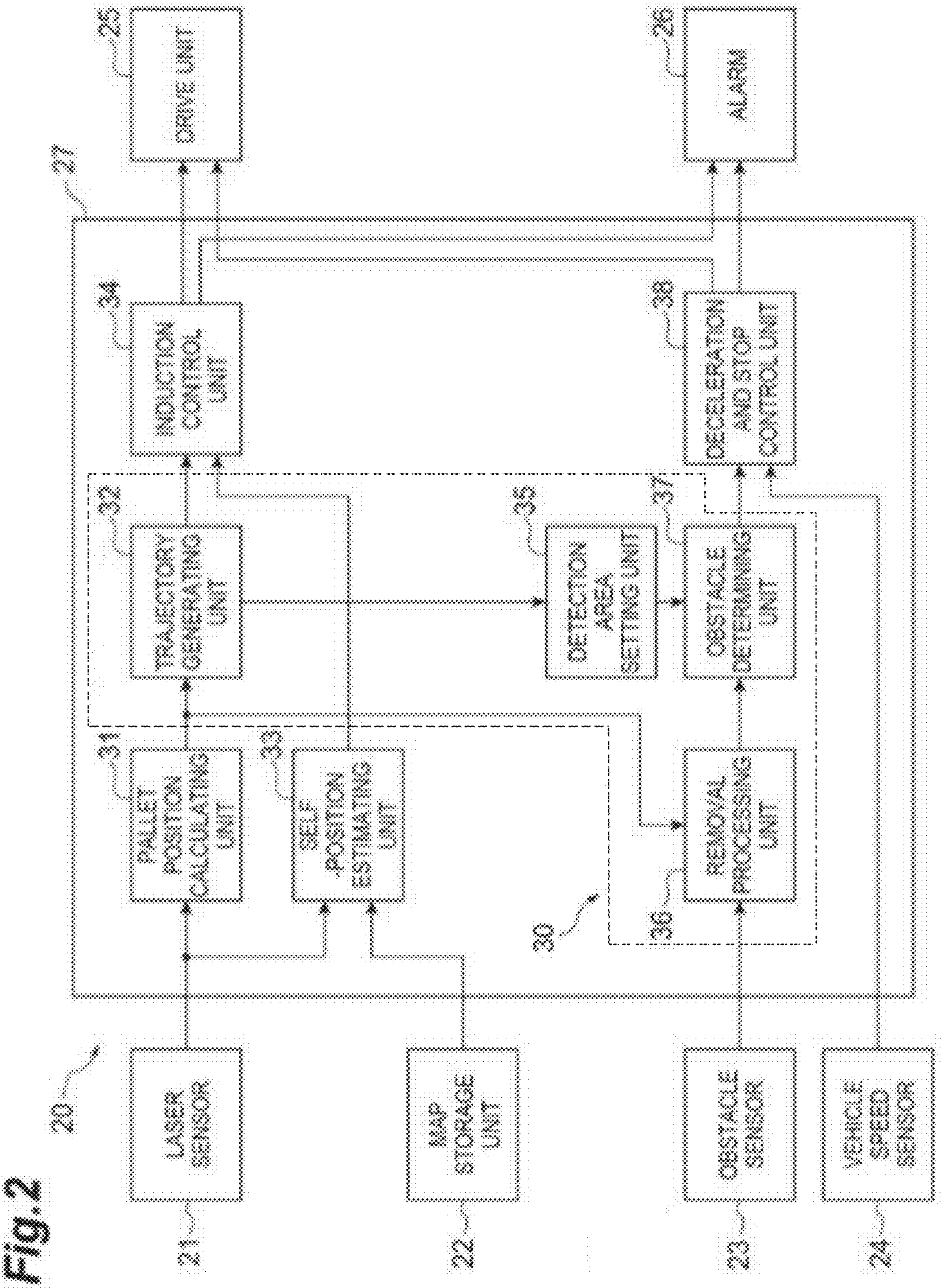
FIG. 2 is a block diagram illustrating a configuration of a traveling control device according to a first embodiment of the present disclosure.
Figure 3:
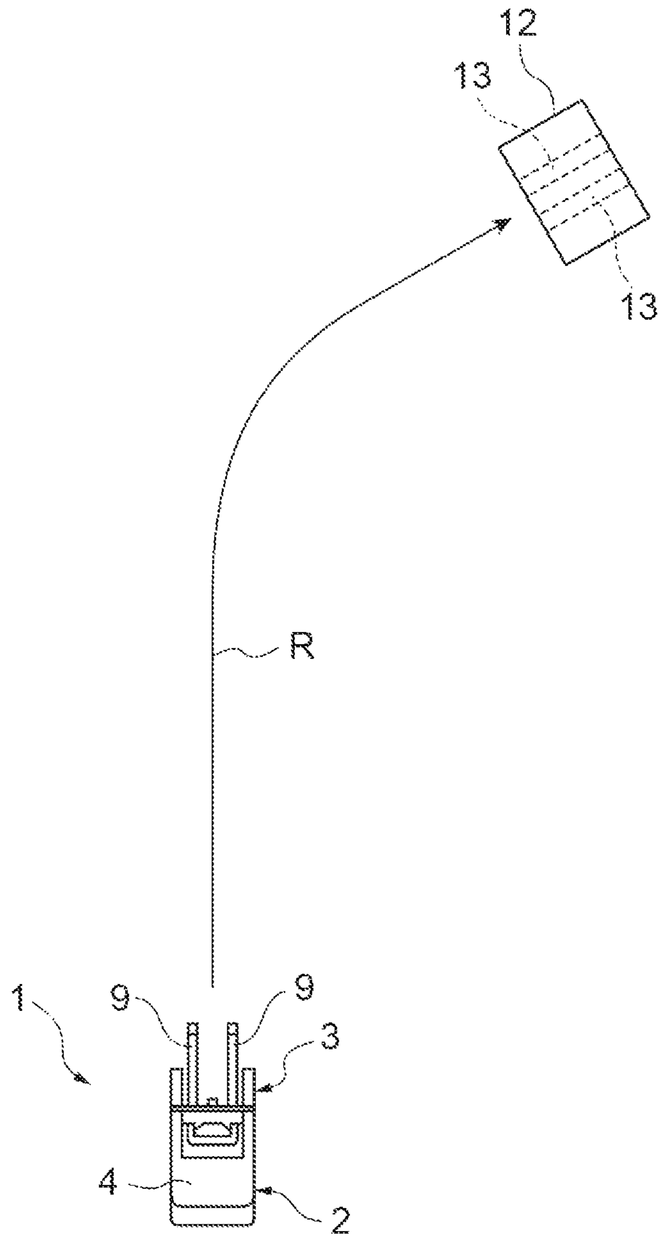
FIG. 3 is a plan view illustrating an example of a scheduled traveling trajectory of a forklift.

FIG. 2 is a block diagram illustrating a configuration of a traveling control device according to a first embodiment of the present disclosure. The traveling control device 20 according to this embodiment is, for example, a device that controls the forklift 1 such that the forklift 1 travels autonomously to an unloading position when unloading work of the pallet 12 is performed as illustrated in FIG. 3. The unloading position is a position at which the forks 9 can be inserted into the fork holes 13 of the pallet 12. The traveling control device 20 is mounted in the forklift 1.

In FIG. 2, the traveling control device 20 includes a laser sensor 21, a map storage unit 22, an obstacle sensor 23, a vehicle speed sensor 24, a drive unit 25, an alarm 26, and a controller 27.

The laser sensor 21 detects a distance to an object near the forklift 1 and acquires point group data by radiating laser light to the surroundings of the forklift 1 and receiving reflected light of the laser light. The point group is a group of reflecting points of the laser light. The object near the forklift 1 includes the pallet 12. For example, a light detection and ranging (LIDAR) unit or a laser range finder is used as the laser sensor 21.

The map storage unit 22 stores map data of an area in which unloading work is performed by the forklift 1. The map data includes pillars, racks, and walls.

The obstacle sensor 23 is an obstacle detecting unit configured to detect an obstacle X (see FIG. 6) that is present near the forklift 1. The obstacle X is a worker or another vehicle. Similarly to the laser sensor 21, a light detection and ranging (LIDAR) unit or a laser range finder is used as the obstacle sensor 23. The number of obstacle sensors 23 may be one or two or more. The vehicle speed sensor 24 detects a traveling speed (a vehicle speed) of the forklift 1.

Although not illustrated, the drive unit 25 includes, for example, a traveling motor that turns the front wheels 5 which are the driving wheels and a steering motor that turns the rear wheels 6 which are the turning wheels. The alarm 26 gives an alarm by a warning sound or a warning display when it is detected that an obstacle X is present in front of (in the traveling direction) of the forklift 1.

The controller 27 includes a CPU, a RAM, a ROM, and an input/output interface. The controller 27 includes a pallet position calculating unit 31, a trajectory generating unit 32, a self-position estimating unit 33, an induction control unit 34 (a first control unit), a detection area setting unit 35, a removal processing unit 36, an obstacle determining unit 37, and a deceleration and stop control unit 38 (a second control unit). These functions are implemented, for example, when the forklift 1 is instructed to start autonomous driving from an operation switch (not illustrated).

The trajectory generating unit 32, the detection area setting unit 35, the removal processing unit 36, and the obstacle determining unit 37 constitute an obstacle detection device 30 that detects whether an obstacle X is present in the traveling direction of the forklift 1 in cooperation with the obstacle sensor 23.

The pallet position calculating unit 31 calculates a position of the pallet 12 relative to the forklift 1 based on the point group data from the laser sensor 21. The pallet position calculating unit 31 calculates a plane equation of a front surface of the pallet 12, for example, using random sample consensus (RANSAC) or a least square method and calculates the position of the pallet 12 relative to the forklift 1 based on the plane equation.

The trajectory generating unit 32 generates a scheduled traveling trajectory R (see FIG. 3) of the forklift 1 to the unloading position (described above) based on the position of the pallet 12 relative to the forklift 1 calculated by the pallet position calculating unit 31. The scheduled traveling trajectory R is a trajectory along which the forklift 1 is scheduled to travel and includes a plurality of trajectory points P (see FIG. 6). The trajectory generating unit 32 constitutes a trajectory acquiring unit that acquires the scheduled traveling trajectory R of the forklift 1 including a plurality of trajectory points P.

The self-position estimating unit 33 estimates a self-position of the forklift 1 based on the point group data from the laser sensor 21 and the map data stored in the map storage unit 22. Specifically, the self-position estimating unit 33 estimates the self-position of the forklift 1, for example, by matching the point group data and the map data using a simultaneous localization and mapping (SLAM) technique. SLAM is a self-position estimation technique of estimating a self-position using sensor data and map data.

The induction control unit 34 controls the drive unit 25 such that the forklift 1 is induced to travel to the unloading position along the scheduled traveling trajectory R generated by the trajectory generating unit 32.

Figure 4:
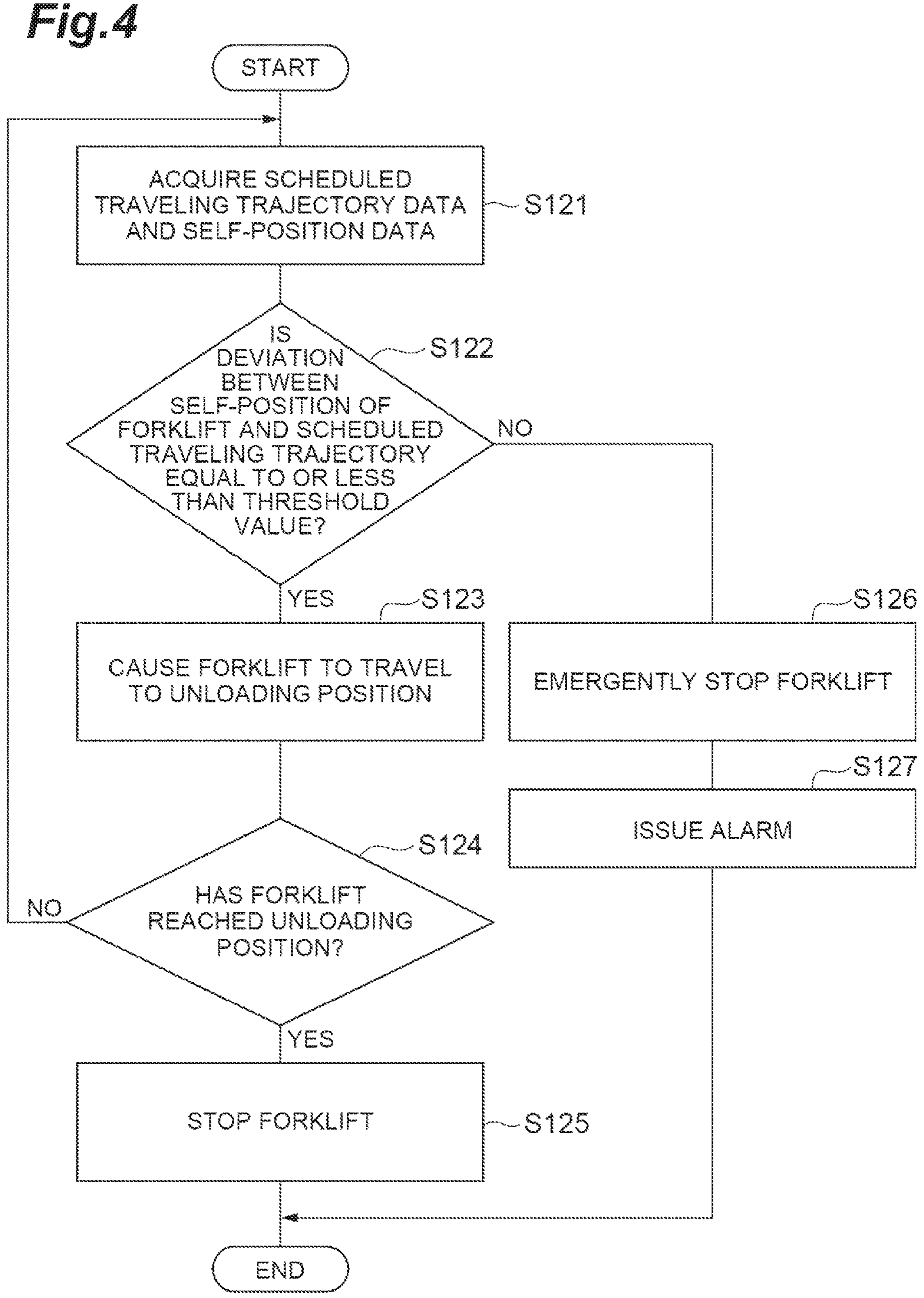
FIG. 4 is a flowchart illustrating a routine of an induction control process which is performed by an induction control unit illustrated in FIG. 2.

FIG. 4 is a flowchart illustrating a routine of an induction control process which is performed by the induction control unit 34. In FIG. 4, first, the induction control unit 34 acquires data of the scheduled traveling trajectory R generated by the trajectory generating unit 32 and self-position data of the forklift 1 estimated by the self-position estimating unit 33 (Procedure S121).

Subsequently, the induction control unit 34 determines whether a deviation between the self-position of the forklift 1 and the scheduled traveling trajectory R is equal to or less than a threshold value (Procedure S122). The threshold value is, for example, a width W1 of a detection frame F (see FIG. 7).

When it is determined that the deviation between the self-position of the forklift 1 and the scheduled traveling trajectory R is equal to or less than the threshold value, the induction control unit 34 controls the drive unit 25 such that the forklift 1 travels to the unloading position (Procedure S123). At this time, the induction control unit 34 controls the drive unit 25 such that the self-position of the forklift 1 approaches the scheduled traveling trajectory R.

Subsequently, the induction control unit 34 determines whether the forklift 1 has reached the unloading position (Procedure S124). When it is determined that the forklift 1 has not reached the unloading position, the induction control unit 34 repeatedly performs Procedure S121. When it is determined that the forklift 1 has reached the unloading position, the induction control unit 34 controls the drive unit 25 such that the forklift 1 stops (Procedure S125).

When it is determined that the deviation between the self-position of the forklift 1 and the scheduled traveling trajectory R is greater than the threshold value in Procedure S122, the induction control unit 34 controls the drive unit 25 such that the forklift 1 stops emergently (Procedure S126). The induction control unit 34 controls the alarm 26 such that an alarm is output (Procedure S127).

Referring back to FIG. 2, the detection area setting unit 35 sets an obstacle detection area for detecting an obstacle X present in the traveling direction of the forklift 1 by mapping a detection frame surrounding the forklift 1 as a whole on the trajectory points P of the scheduled traveling trajectory R generated by the trajectory generating unit 32.

Figure 5:
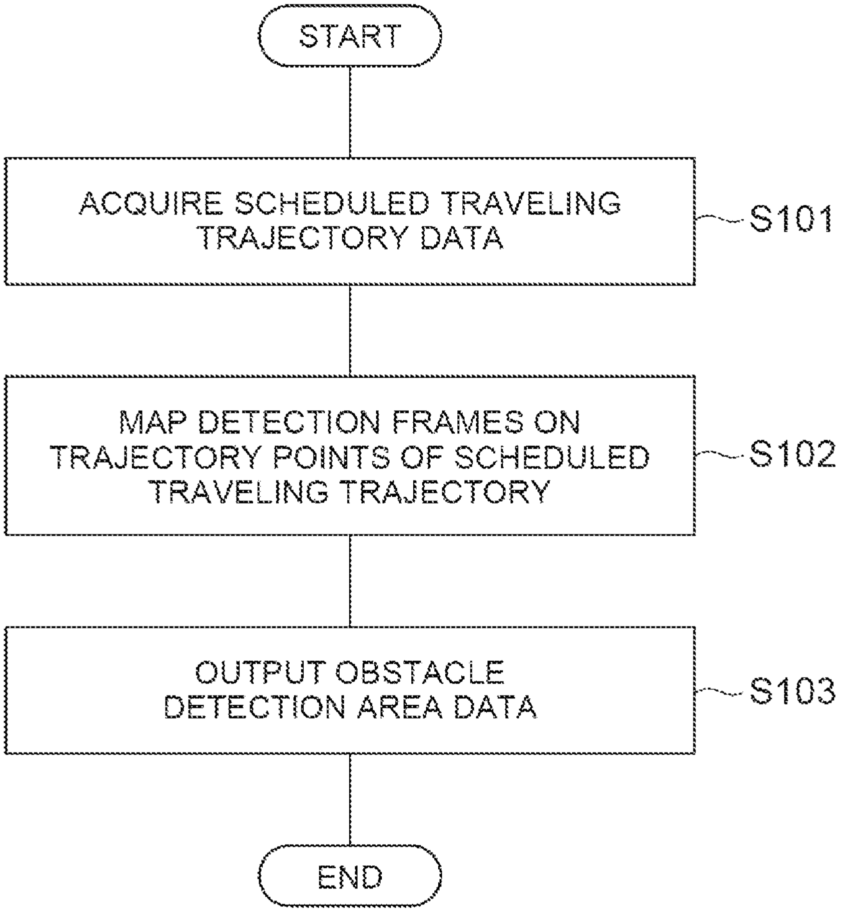
FIG. 5 is a flowchart illustrating a routine of a detection area setting process which is performed by the detection area setting unit illustrated in FIG. 2.

FIG. 5 is a flowchart illustrating a routine of a detection area setting process which is performed by the detection area setting unit 35. In FIG. 5, first, the detection area setting unit 35 acquires data of the scheduled traveling trajectory R generated by the trajectory generating unit 32 (Procedure S101).

Figure 6:
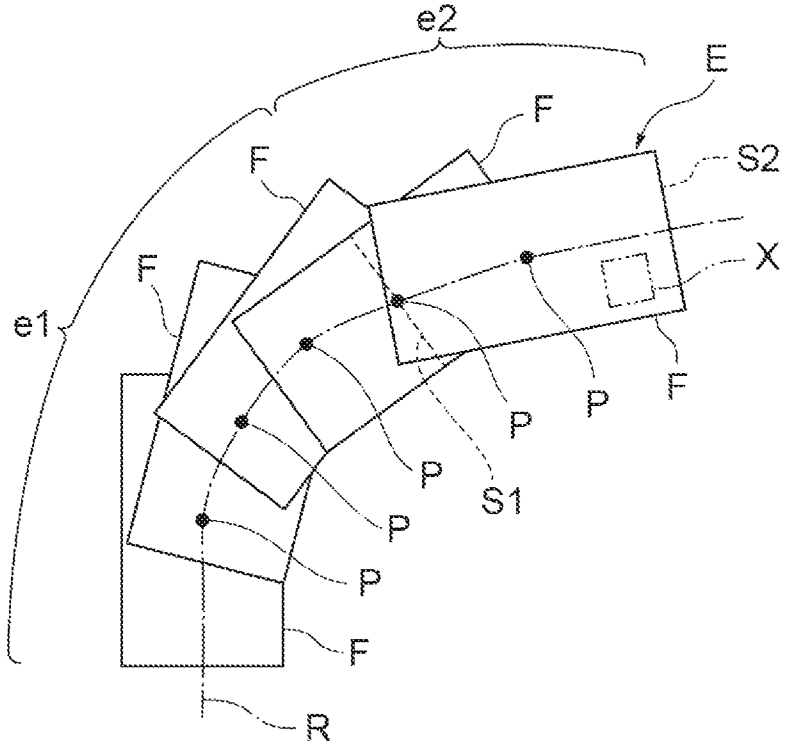
FIG. 6 is a diagram illustrating an example of an obstacle detection area which is set by the detection area setting unit illustrated in FIG. 2.
Figure 7:
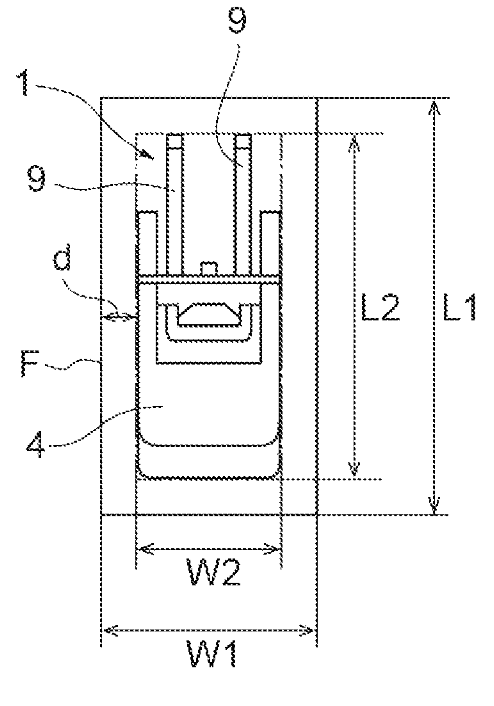
FIG. 7 is a diagram illustrating a dimensional relationship of a forklift with detection frames forming the obstacle detection area illustrated in FIG. 6.

Subsequently, the detection area setting unit 35 maps a rectangular detection frame F surrounding the forklift 1 as a whole on a plurality of trajectory points P of the scheduled traveling trajectory R as illustrated in FIGS. 6 and 7 (Procedure S102). At this time, the detection frame F is mapped on the trajectory points P such that the trajectory points P are located at the center of the detection frame F. Accordingly, an obstacle detection area E including a plurality of detection frames F is set.

The size of the detection frame F is larger in the longitudinal direction and the lateral direction of the forklift 1 than the overall size of the forklift 1 as illustrated in FIG. 7. Specifically, a length L1 of the detection frame F is larger than the total length L2 of the forklift 1. The total length L2 of the forklift 1 is a length from a tip (a front end) of the forks 9 of the forklift 1 to a rear end of the vehicle body 4. The width W1 of the detection frame F is larger than the total width W2 of the forklift 1. The total width W2 of the forklift 1 is a vehicle width of the forklift 1.

The size of the detection frame F is larger by a prescribed value d in the longitudinal direction and the lateral direction than the overall size of the forklift 1. An actual traveling trajectory of the forklift 1 may deviate from the scheduled traveling trajectory R due to a self-position estimation error caused by the self-position estimating unit 33, an induction error caused by the induction control unit 34, and the like. Therefore, the prescribed value d is set to a value which can absorb a deviation of the actual traveling trajectory of the forklift 1 from the scheduled traveling trajectory R.

The detection area setting unit 35 does not need to map the detection frame F on all the trajectory points P of the scheduled traveling trajectory R and may map the detection frame F on the trajectory points P with a predetermined interval therebetween. Accordingly, it is possible to shorten a calculation processing time. In this case, it is possible to prevent a part of the obstacle detection area E from being missed by setting the interval between the trajectory points P to be mapped such that the neighboring detection frames F overlap partially.

The interval between the trajectory points P to be mapped in only a part which is missed in the obstacle detection area E may be set to be less, or the size of the detection frame F in a part which is missed in the obstacle detection area E may be set to be greater.

The detection area setting unit 35 outputs data of the obstacle detection area E to the obstacle determining unit 37 after Procedure S102 has been performed (Procedure S103).

Referring back to FIG. 2, the removal processing unit 36 removes reflecting points corresponding to an object other than an obstacle X from the point group data from the obstacle sensor 23. That is, the removal processing unit 36 removes a part corresponding to an object other than an obstacle X in the detection data from the obstacle sensor 23. Accordingly, it is possible to acquire point group data (processed data) from which reflecting points corresponding to an object other than an obstacle X have been removed.

The object other than an obstacle X is an object of which a position and a size are known or can be acquired. The object other than an obstacle X includes the forks 9 and the pallet 12. The positions of the forks 9, the length of the fork 9, and the size of the pallet 12 are known in advance. The position of the pallet 12 relative to the forklift 1 is acquired from the pallet position calculating unit 31. Accordingly, it is possible to easily remove the parts corresponding to the forks 9, the pallet 12, and the like in the point group data from the obstacle sensor 23.

The obstacle determining unit 37 determines whether an obstacle X is present in the obstacle detection area E set by the detection area setting unit 35 based on the point group data from the obstacle sensor 23. At this time, the obstacle determining unit 37 determines whether an obstacle X is present in the obstacle detection area E based on processed data from which reflecting points corresponding to an object other than the obstacle X have been removed by the removal processing unit 36.

When the obstacle determining unit 37 determines that an obstacle X is present in the obstacle detection area E, the deceleration and stop control unit 38 controls the drive unit 25 such that the forklift 1 decelerates or stops and controls the alarm 26 such that an alarm is issued. The deceleration and stop control unit 38 controls the drive unit 25 such that the forklift 1 stops when a distance to the obstacle X is equal to or less than a prescribed value and controls the drive unit 25 such that the forklift 1 decelerates when the distance to the obstacle X is greater than the prescribed value.

Figure 8:
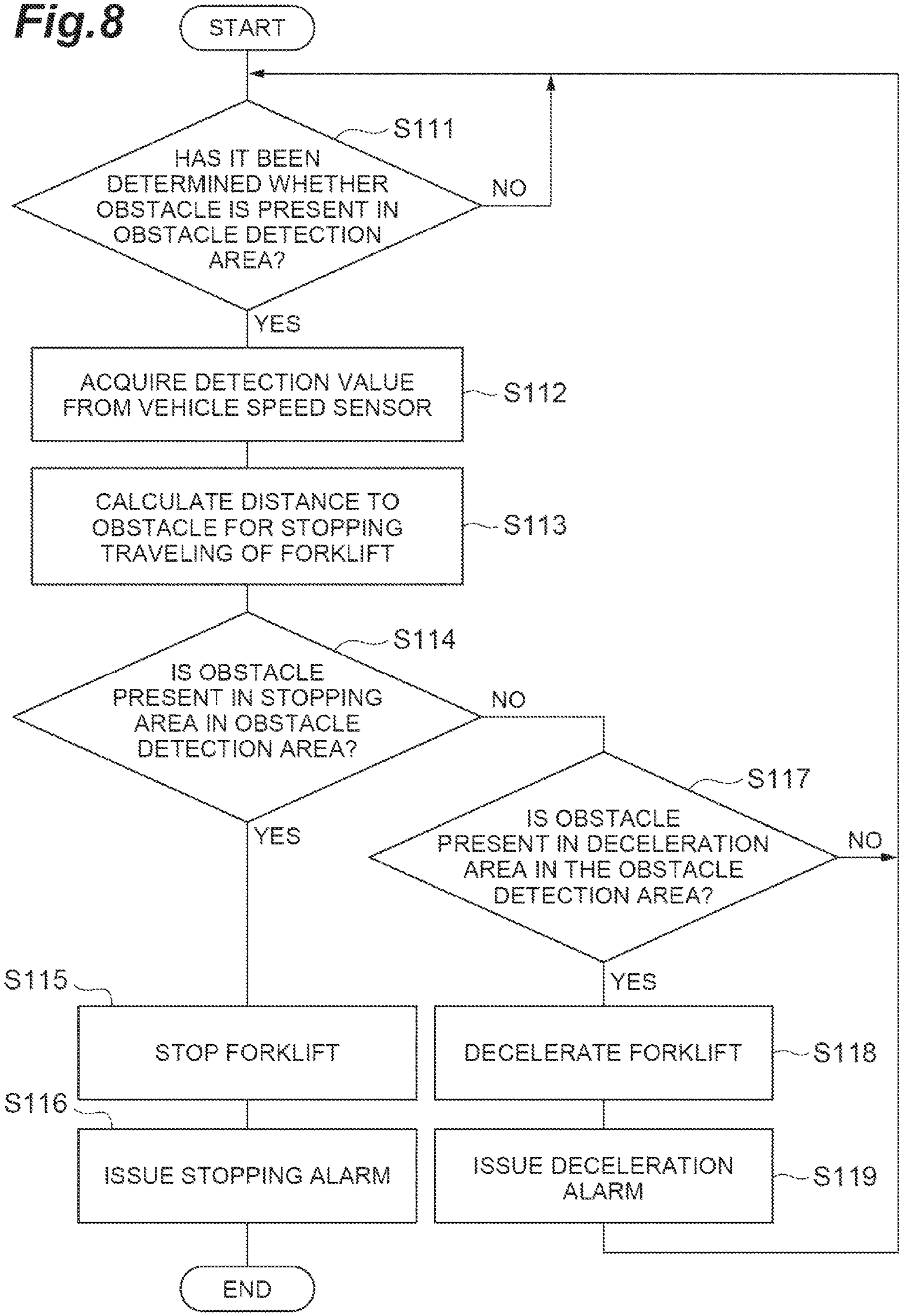
FIG. 8 is a flowchart illustrating a routine of a deceleration and stopping control process which is performed by a deceleration and stop control unit illustrated in FIG. 2.

FIG. 8 is a flowchart illustrating a routine of the deceleration and stop control process which is performed by the deceleration and stop control unit 38. In FIG. 8, first, the deceleration and stop control unit 38 determines whether the obstacle determining unit 37 has determined that an obstacle X is present in the obstacle detection area E (Procedure S111).

When it is determined that it has been determined that an obstacle X is present in the obstacle detection area E, the deceleration and stop control unit 38 acquires a detection value from the vehicle speed sensor 24 (Procedure S112). Then, the deceleration and stop control unit 38 calculates a distance for stopping traveling of the forklift 1 when the forklift 1 travels along the scheduled traveling trajectory R based on the detection value from the vehicle speed sensor 24 (Procedure S113).

Here, when a current vehicle speed of the forklift 1 is defined as v and a deceleration of the forklift 1 is defined as a, the time t in the following expression is required to stop traveling of the forklift 1. The deceleration a is determined in advance.

$$t=v/a$$

The distance x for stopping traveling of the forklift 1 is expressed by the following expression by integrating the current vehicle speed v of the forklift 1.

$$x=v^2/2a$$

Subsequently, the deceleration and stop control unit 38 determines whether an obstacle X is present in a stop area e1 (see FIG. 6) in the obstacle detection area E (Procedure S114). The stop area e1 is an area closer to the forklift 1 than a stopping threshold value S1 (prescribed value) in the obstacle detection area E.

The stopping threshold value S1 is a value obtained by adding a margin to the distance x when the vehicle speed v of the forklift 1 is set to a fixed value v0 corresponding to a very low speed. The fixed value v0 corresponding to a very low speed is lower than an actual vehicle speed v of the forklift 1. The stopping threshold value S1 represents a position corresponding to the trajectory points P in the detection frames F including a stopping area e1 and a deceleration area e2 (which will be described later) (see FIG. 6).

When it is determined that an obstacle X is present in the stopping area e1 in the obstacle detection area E, the deceleration and stop control unit 38 controls the drive unit 25 such that the forklift 1 stops (Procedure S115). The deceleration and stop control unit 38 controls the alarm 26 such that an alarm for stopping is issued (Procedure S116).

When it is determined that an obstacle X is not present in the stopping area e1 in the obstacle detection area E, the deceleration and stop control unit 38 determines whether an obstacle X is present in the deceleration area e2 (see FIG. 6) in the obstacle detection area E (Procedure S117). The deceleration area e2 is an area between the stopping threshold value S1 and the deceleration threshold value S2 in the obstacle detection area E.

The deceleration threshold value S2 represents a position farther from the forklift 1 than the stopping threshold value S1. The deceleration threshold value S2 is a value obtained by adding a margin to the distance x at the current vehicle speed v of the forklift 1. The deceleration threshold value S2 represents, for example, a position corresponding to an end in the traveling direction of the detection frame F farthest from the forklift 1 in the deceleration area e2 (see FIG. 6).

When it is determined that an obstacle X is present in the deceleration area e2 in the obstacle detection area E, the deceleration and stop control unit 38 controls the drive unit 25 such that the forklift 1 decelerates (Procedure S118). The deceleration and stop control unit 38 controls the alarm 26 such that an alarm for deceleration is issued (Procedure S119) and performs Procedure S111 again.

When it is determined that an obstacle X is not present in the deceleration area e2 in the obstacle detection area E, the deceleration and stop control unit 38 performs Procedure S111 again.

For example, when a scheduled traveling trajectory R is predicted based on a current operation direction and a current amount of operation of a steering wheel 15 (see FIG. 1), there is a likelihood that the actual traveling trajectory of the forklift 1 will deviate greatly from the scheduled traveling trajectory R. In manned driving, since a worker operates the steering wheel, traveling of the forklift 1 does not stop when an obstacle X is not present in the actual traveling trajectory. However, in unmanned driving, when the actual traveling trajectory deviates from the scheduled traveling trajectory R, it may be erroneously detected that an obstacle X is present even if the obstacle X is not present in the actual traveling trajectory. In this case, traveling of the forklift 1 stops even if an obstacle X is not present in the actual traveling trajectory.

Figure 9A:
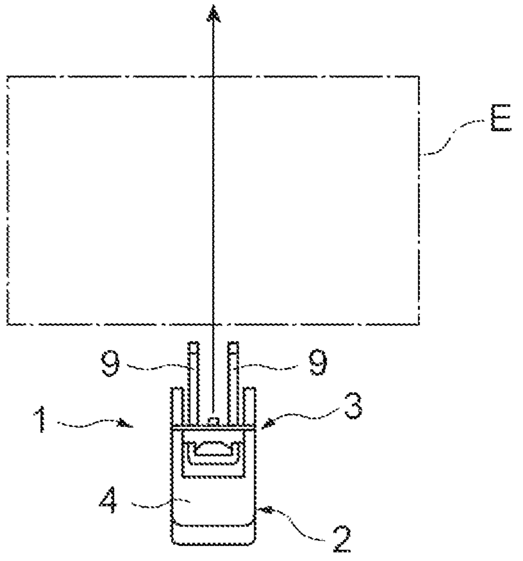
FIG. 9A is a plan view schematically illustrating a comparative example in which an obstacle detection area is set based on an actual position of a forklift.
Figure 9B:
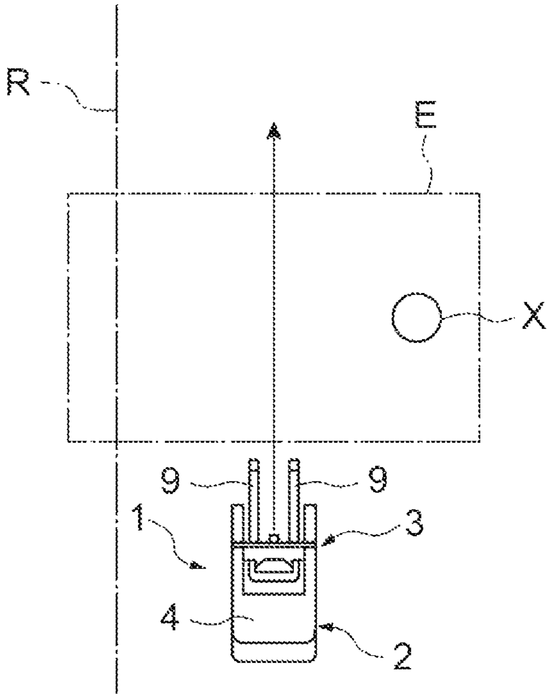
FIG. 9B is a plan view schematically illustrating an example in which an obstacle is erroneously detected in the case illustrated in FIG. 9A.

For example, when the obstacle detection area E is set based on the actual position of the forklift 1 as illustrated in FIG. 9A, the position of the obstacle detection area E changes depending on the actual position of the forklift 1 regardless of the scheduled traveling trajectory R of the forklift 1. Accordingly, when the actual traveling trajectory of the forklift 1 deviates from the scheduled traveling trajectory R as illustrated in FIG. 9B, it may be erroneously detected that an obstacle X is present in the traveling direction of the forklift 1 when an obstacle X is not present in the actual traveling trajectory but an obstacle X is present in the obstacle detection area E.

Figure 10A:
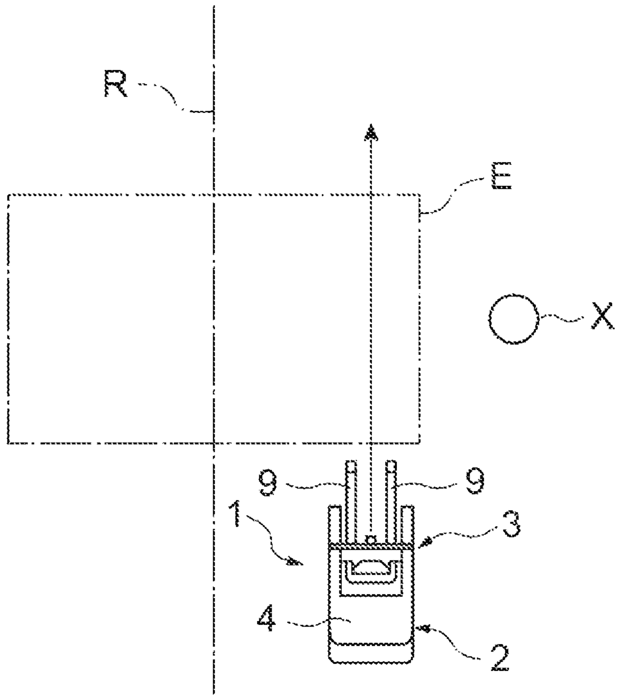
FIG. 10A is a plan view schematically illustrating an example in which an obstacle detection area is set in the obstacle detection device illustrated in FIG. 2.

Regarding this problem, according to this embodiment, the obstacle detection area E including a plurality of detection frames F is set based on the scheduled traveling trajectory R of the forklift 1 as illustrated in FIG. 10A. Accordingly, the position of the obstacle detection area E does not change even when the actual traveling trajectory of the forklift 1 deviates from the scheduled traveling trajectory R, and it is not erroneously detected that an obstacle X is present in the traveling direction of the forklift 1 when the obstacle X is not present in the obstacle detection area E.

Figure 10B:
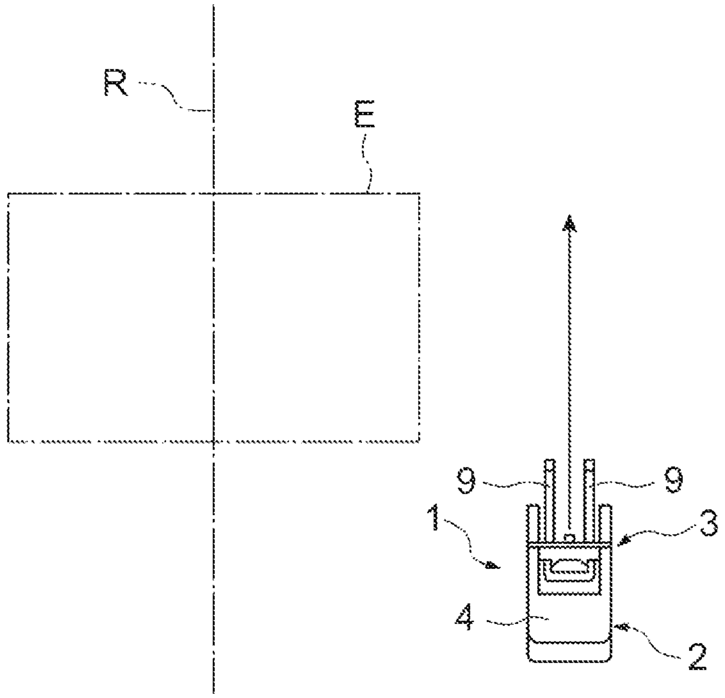
FIG. 10B is a plan view schematically illustrating an operation state when a self-position of the forklift deviates from a scheduled traveling trajectory in the case illustrated in FIG. 10A.

When the self-position of the forklift 1 excessively deviates from the scheduled traveling trajectory R as illustrated in FIG. 10B, the forklift 1 stops emergently regardless of whether an obstacle X is present.

As described above, according to this embodiment, a scheduled traveling trajectory R of the forklift 1 including a plurality of trajectory points P is acquired. By mapping the detection frames F surrounding the forklift 1 as a whole on the trajectory points P of the scheduled traveling trajectory R, an obstacle detection area E for detecting an obstacle X present in the traveling direction of the forklift 1 is set. It is determined whether an obstacle X is present in the obstacle detection area E based on detection data from the obstacle sensor 23 that detects an obstacle X. Accordingly, even when the actual traveling trajectory of the forklift 1 deviates from the scheduled traveling trajectory R, it is detected that an obstacle X is present in the traveling direction of the forklift 1 when the obstacle X is present in the obstacle detection area E acquired from the plurality of detection frames F. Accordingly, erroneous detection of an obstacle X is curbed even when the scheduled traveling trajectory R and the actual traveling trajectory deviate from each other. As a result, it is possible to curb traveling stop of the forklift 1 due to erroneous detection of an obstacle X.

In this embodiment, the size of each detection frame F is larger in the longitudinal direction and the lateral direction of the forklift 1 than the overall size of the forklift 1. In this case, since the size of each detection frame F has a margin in the longitudinal direction and the lateral direction of the forklift 1 from the overall size of the forklift 1, a larger obstacle detection area E is set. Accordingly, it is possible to accurately detect whether an obstacle X is present in the traveling direction of the forklift 1 regardless of an error which is caused when the forklift 1 travels along the scheduled traveling trajectory R.

In this embodiment, reflecting points corresponding to an object other than an obstacle X (such as the forks 9 and the pallets 12) are removed in the point group data from the obstacle sensor 23, and it is determined whether an obstacle X is present in the obstacle detection area E based on processed data from which the reflecting points have been removed. In this way, since the reflecting points corresponding to an object other than an obstacle X are removed from the point group data from the obstacle sensor 23, it is possible to further curb erroneous detection of an obstacle X.

In this embodiment, the drive unit 25 is controlled such that the forklift 1 stops when the distance to an obstacle X is equal to or less than the stopping threshold value S1, and the drive unit 25 is controlled such that the forklift 1 decelerates when the distance to the obstacle X is greater than the stopping threshold value S1. In this way, when it is detected that an obstacle X is present in the traveling direction of the forklift 1, a traveling state of the forklift 1 is appropriately controlled based on the distance from the forklift 1 to the obstacle X.

Figure 11:
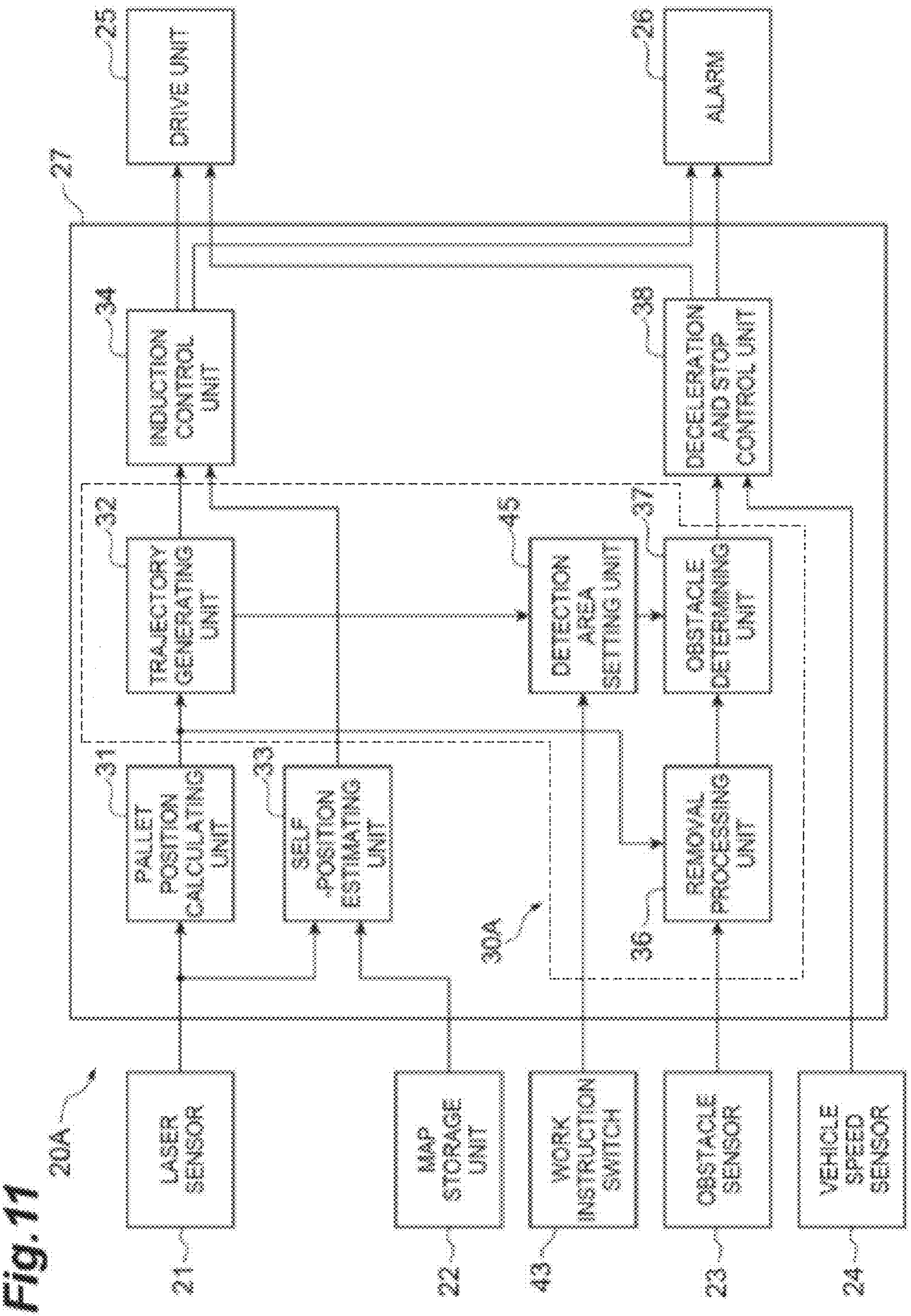
FIG. 11 is a block diagram illustrating a configuration of a traveling control device according to a second embodiment of the present disclosure.

FIG. 11 is a block diagram illustrating a configuration of a traveling control device according to a second embodiment of the present disclosure. The traveling control device 20A according to this embodiment is a device that performs control such that the forklift 1 travels autonomously when loading and unloading of a pallet 12 are performed.

Figure 12A:
FIG. 12A is a plan view illustrating an example in which pallet loading work is performed using a normal fork.

When loading of the pallet 12 is performed as illustrated in FIG. 12A, the traveling control device 20A performs control such that a forklift 1 in which the pallet 12 is held by a normal fork 41 travels autonomously to a loading position. The normal fork 41 is the same as the fork 9 in the first embodiment. Here, the loading position is a position at which a pallet 12 held by the normal fork 41 can be stacked on another pallet 12 placed already.

Figure 12B:
FIG. 12B is a plan view illustrating an example in which pallet unloading work is performed using a long fork.

When unloading of the pallet 12 is performed as illustrated in FIG. 12B, the traveling control device 20A performs control such that the forklift 1 having a long fork 42 attached thereto travels autonomously to an unloading position. The long fork 42 is a fork longer than the normal fork 41. When the long fork 42 is used, two pallets 12 disposed in the longitudinal direction (a depth direction) can be unloaded together. The unloading position is a position at which the long fork 42 is inserted into fork holes 13 of the two pallets 12.

The normal fork 41 and the long fork 42 are a plurality of types of detachable working tools with different sizes in the longitudinal direction of the forklift 1.

In FIG. 11, the traveling control device 20A includes a work instruction switch 43 in addition to the configuration according to the first embodiment. The work instruction switch 43 is an operation switch for instructing which of loading and unloading a worker is to perform.

A controller 27 of the traveling control device 20A includes a detection area setting unit 45 instead of the detection area setting unit 35 according to the first embodiment.

The trajectory generating unit 32, the detection area setting unit 45, the removal processing unit 36, and the obstacle determining unit 37 constitute an obstacle detection device 30A that detects whether an obstacle X is present in the traveling direction of the forklift 1 in cooperation with the obstacle sensor 23.

The detection area setting unit 45 sets an obstacle detection area E for detecting an obstacle X in the traveling direction of the forklift 1 by mapping detection frames F on the trajectory points P of the scheduled traveling trajectory R. At this time, the detection area setting unit 45 maps the detection frames F having different sizes depending on the type of the used fork (see FIG. 14A and FIG. 15B).

Figure 13:
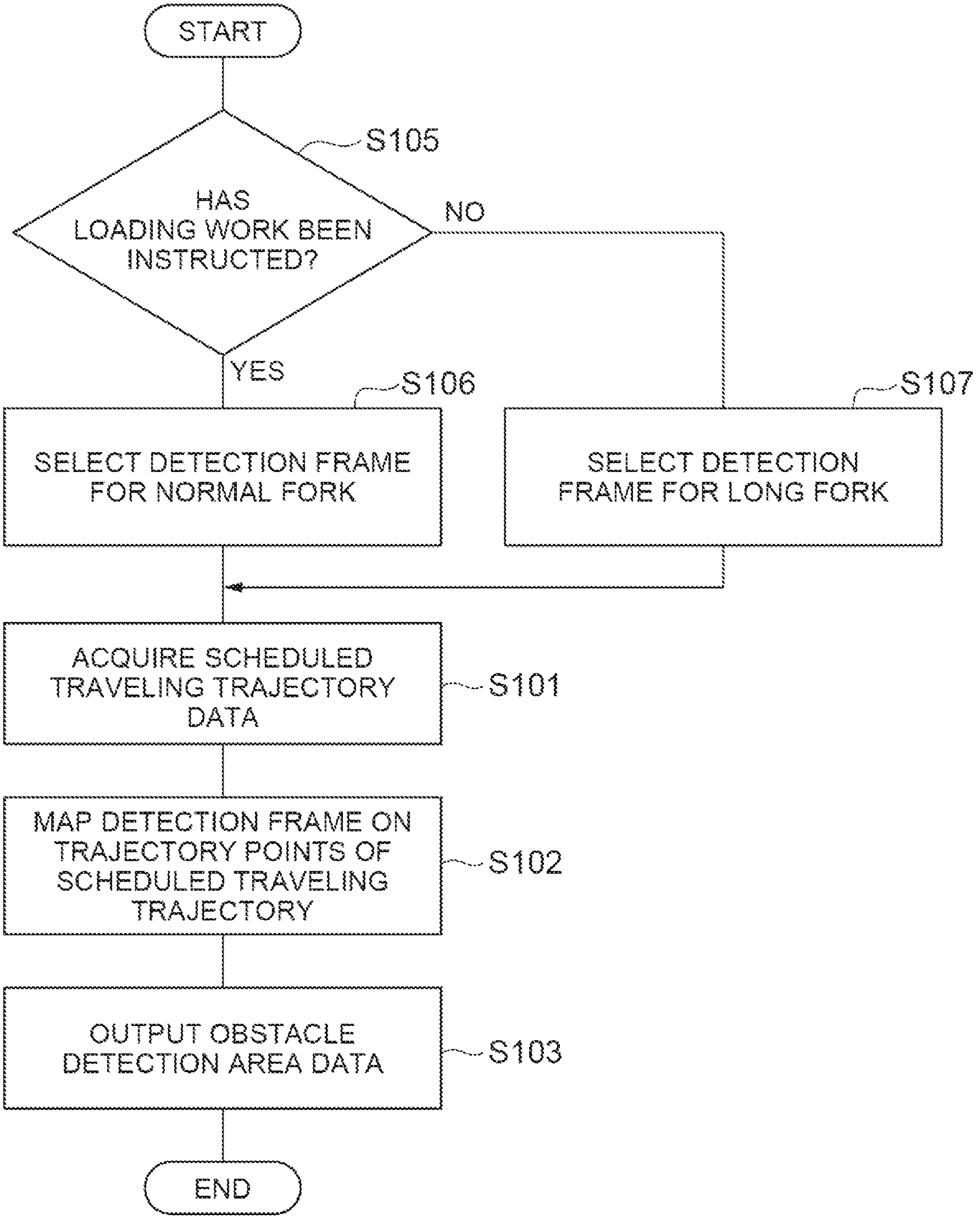
FIG. 13 is a flowchart illustrating a routine of a detection area setting process which is performed by a detection area setting unit illustrated in FIG. 11.

FIG. 13 is a flowchart illustrating a routine of the detection area setting process which is performed by the detection area setting unit 45 and corresponds to FIG. 4. In FIG. 13, first, the detection area setting unit 45 determines whether loading work has been instructed by the work instruction switch 43 (Procedure S105).

Figure 14A:
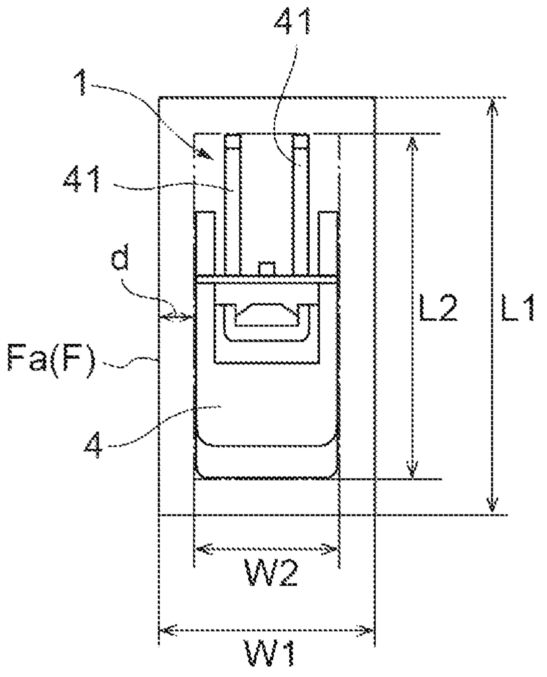
FIG. 14A is a diagram illustrating a detection frame for a normal fork along with a dimensional relationship with a forklift.

When it is determined that loading work is instructed, the detection area setting unit 45 selects a detection frame Fa for the normal fork 41 as illustrated in FIG. 14A (Procedure S106). The detection frame Fa for the normal fork 41 is the same as the detection frame F in the first embodiment.

Figure 14B:
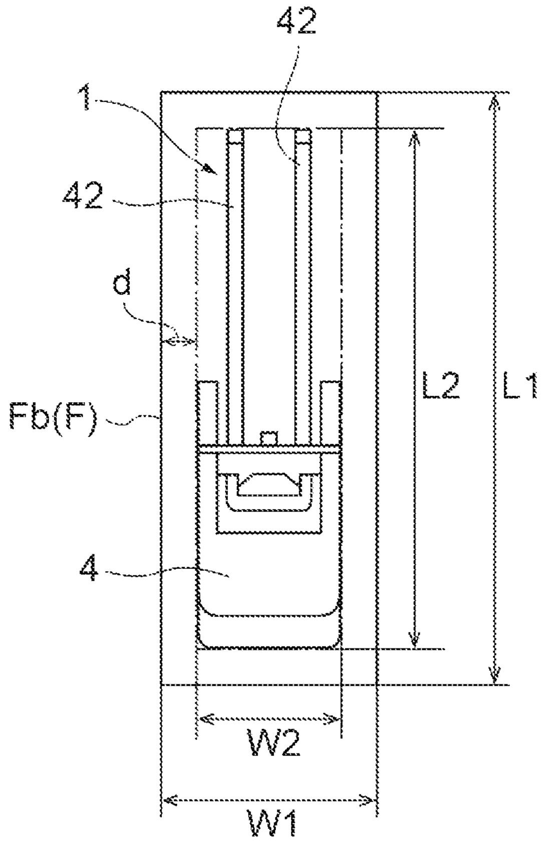
FIG. 14B is a diagram illustrating a detection frame for a long fork along with a dimensional relationship with a forklift.

When it is determined that loading work is not instructed, the detection area setting unit 45 determines that unloading work is instructed and selects a detection frame Fb for the long fork 42 as illustrated in FIG. 14B (Procedure S107). The length L1 of the detection frame Fb for the long fork 42 is larger than the length L1 of the detection frame Fa for the normal fork 41 by a difference between the length of the long fork 42 and the length the normal fork 41. The width W1 of the detection frame Fb for the long fork 42 is equal to the width W1 of the detection frame Fa for the normal fork 41.

After Procedure S106 or S107 has been performed, the detection area setting unit 45 acquires data of the scheduled traveling trajectory R generated by the trajectory generating unit 32 (Procedure S101). Subsequently, the detection area setting unit 45 sets an obstacle detection area E by mapping the detection frame Fa selected in Procedure S106 or the detection frame Fb selected in Procedure S107 on the trajectory points P of the scheduled traveling trajectory R (Procedure S102). Subsequently, the detection area setting unit 45 outputs data of the obstacle detection area E to the obstacle determining unit 37 (Procedure S103).

In the second embodiment, similarly to the first embodiment, it is possible to curb erroneous detection of an obstacle X even when the scheduled traveling trajectory R and the actual traveling trajectory deviate from each other.

In this embodiment, an appropriate detection frame F is mapped on the trajectory points P of the scheduled traveling trajectory R depending on the type of the used fork (the normal fork 41 and the long fork 42). Accordingly, it is possible to curb erroneous detection of an obstacle X even when a plurality of types of forks are used.

The present disclosure is not limited to the aforementioned embodiments. In the first embodiment, control is performed such that the forklift 1 travels to an unloading position when unloading of a pallet 12 is performed, but the present disclosure is not particularly limited thereto. For example, similarly to the second embodiment, when loading work of a pallet 12 is performed, control may be performed such that the forklift 1 in which a pallet 12 is held by the fork 9 travels to the unloading position. When another loading/unloading work using the fork 9 is performed, control may be performed such that the forklift 1 travels to a predetermined position.

In the second embodiment, control is performed such that the forklift 1 travels to a loading position when loading work of a pallet 12 is performed using the normal fork 41 and control is performed such that the forklift 1 travels to an unloading position when unloading work of a pallet 12 is performed using the long fork 42, but the present disclosure is not particularly to the embodiment. For example, loading/unloading work may be performed using detachable forks and attachments. The forks and the attachments are a plurality of types of working tools having different sizes in at least the lateral direction of the longitudinal direction and the lateral direction of the forklift 1. In this case, a detection frame for a fork and a detection frame for an attachment are set.

In the aforementioned embodiments, the length L1 of the detection frame F is larger than the total length L2 of the forklift 1 and the width W1 of the detection frame F is larger than the total width W2 of the forklift 1, but the present disclosure is not particularly limited to the embodiments. As long as the forklift 1 is surrounded as a whole, only the length L1 of the detection frame F may be larger than the total length L2 of the forklift 1 or only the width W1 of the detection frame F may be larger than the total width W2 of the forklift 1. The length L1 of the detection frame F may be equal to the total length L2 of the forklift 1 and the width W1 of the detection frame F may be equal to the total width W2 of the forklift 1.

In the aforementioned embodiments, the shape of the detection frame F is rectangular, but the shape of the detection frame F is not particularly limited to a rectangular shape and may be a polygonal shape surrounding the forklift 1 as a whole.

In the aforementioned embodiments, the position of a pallet 12 relative to the forklift 1 is calculated based on the point group data of the laser sensor 21 and the self-position of the forklift 1 is estimated based on the point group data from the laser sensor 21 and the map data stored in the map storage unit 22, but the present disclosure is not particularly to the embodiments. For example, a laser sensor for detecting a pallet and a laser sensor for estimating a self-position may be separately provided.

In the aforementioned embodiments, the self-position of the forklift 1 is estimated using the SLAM method based on the point group data from the laser sensor 21, but the present disclosure is not particularly limited to the embodiments. Examples of the technique of estimating the self-position of the forklift 1 include an SLAM method based on image data from a camera, an odometry sensor that detects an amount of movement and a movement direction of the forklift 1, and an inertial measuring unit (IMU) that measures an angular velocity and an acceleration of the forklift 1.

In the aforementioned embodiments, a scheduled traveling trajectory R of the forklift 1 is generated based on the position of the pallet 12 relative to the forklift 1, but the present disclosure is not particularly limited to the embodiments. For example, when the position of the pallet 12 relative to the forklift 1 is not calculated, the scheduled traveling trajectory R of the forklift 1 may be predicted based on an operating direction and an amount of operation of the steering wheel 15 of the forklift 1.

In the aforementioned embodiments, the forklift 1 is controlled such that the forklift 1 travels to a predetermined position along the scheduled traveling trajectory R, but the present disclosure can also be applied to an industrial vehicle such as a towing tractor.

What is claimed is:

1. An obstacle detection device comprising:
a controller configured to:
acquire a scheduled traveling trajectory along which an industrial vehicle is scheduled to travel, the scheduled traveling trajectory including a plurality of trajectory points, and estimate an actual traveling trajectory along which the industrial vehicle is predicted to travel based on estimated position data of the industrial vehicle;
set an obstacle detection area for detecting an obstacle which is present in a traveling direction of the industrial vehicle by mapping, for each trajectory point of the scheduled traveling trajectory, a detection frame surrounding the industrial vehicle as a whole on the trajectory points along the scheduled traveling trajectory such that the trajectory points are positioned at a center of the detection frame; and
determine whether the obstacle is present in the obstacle detection area set based on detection data received from a sensor and cause a motor to control an operation of the industrial vehicle based on the determination,
wherein the obstacle detection area is set based on the detection frames from each trajectory point of the scheduled traveling trajectory, independent of the actual traveling trajectory of the industrial vehicle
wherein the controller is further configured to:
determine a deviation between the scheduled traveling trajectory and the actual traveling trajectory, and
based on the deviation being greater than a predetermined threshold value, cause the motor to control the operation of the industrial vehicle to stop the industrial vehicle, wherein the predetermined threshold value is based on a size of the detection frame.

2. A traveling control device comprising:
a motor configured to cause an industrial vehicle to travel;
a sensor configured to detect an obstacle; and
a controller configured to:
acquire a scheduled traveling trajectory along which the industrial vehicle is scheduled to travel, the scheduled traveling trajectory including a plurality of trajectory points;
estimate an actual traveling trajectory along which the industrial vehicle is predicted to travel based on estimated position data of the industrial vehicle;
control the motor such that the industrial vehicle travels along the scheduled traveling trajectory;
set an obstacle detection area for detecting an obstacle which is present in a traveling direction of the industrial vehicle by mapping, for each trajectory point of the scheduled traveling trajectory, a detection frame surrounding the industrial vehicle as a whole on the trajectory points along the scheduled traveling trajectory such that the trajectory points are positioned at a center of the detection frame;
determine whether the obstacle is present in the obstacle detection area set based on detection data from the sensor; and
control the motor such that the industrial vehicle decelerates or stops based on a determination that the obstacle is present in the obstacle detection area,
wherein the obstacle detection area is set based on the detection frames from each trajectory point of the scheduled traveling trajectory, independent of the actual traveling trajectory of the industrial vehicle, wherein the controller is further configured to:
determine a deviation between the scheduled traveling trajectory and the actual traveling trajectory, and
based on the deviation between the scheduled traveling trajectory and the actual traveling trajectory being greater than a predetermined threshold value, control the motor such that the industrial vehicle stops, wherein the predetermined threshold value is based on a size of the detection frame.

* * * * *